United States Patent
Brostmeyer et al.

(10) Patent No.: US 10,151,211 B2
(45) Date of Patent: Dec. 11, 2018

(54) APPARATUS AND PROCESS FOR CONVERTING AN AERO GAS TURBINE ENGINE INTO AN INDUSTRIAL GAS TURBINE ENGINE FOR ELECTRIC POWER PRODUCTION

(71) Applicants: Joseph D Brostmeyer, Jupiter, FL (US); Russell B Jones, North Palm Beach, FL (US)

(72) Inventors: Joseph D Brostmeyer, Jupiter, FL (US); Russell B Jones, North Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 335 days.

(21) Appl. No.: 14/854,119

(22) Filed: Sep. 15, 2015

(65) Prior Publication Data
US 2018/0010476 A1    Jan. 11, 2018

Related U.S. Application Data

(60) Provisional application No. 62/101,993, filed on Jan. 10, 2015.

(51) Int. Cl.
| | |
|---|---|
| *F01D 15/10* | (2006.01) |
| *F02C 3/10* | (2006.01) |
| *F01D 1/04* | (2006.01) |
| *F02C 3/04* | (2006.01) |
| *F02C 9/22* | (2006.01) |

(52) U.S. Cl.
CPC ............... *F01D 15/10* (2013.01); *F01D 1/04* (2013.01); *F02C 3/10* (2013.01); *F02C 3/04* (2013.01); *F02C 9/22* (2013.01); *F05D 2220/32* (2013.01); *F05D 2220/3213* (2013.01); *F05D 2220/3215* (2013.01); *F05D 2220/76* (2013.01)

(58) Field of Classification Search
CPC ...... F02C 3/04; F02C 3/10; F02C 9/22; F05D 2220/3213; F05D 2220/3215; F01D 15/10
See application file for complete search history.

(56) References Cited

U.S. PATENT DOCUMENTS

| | | | | |
|---|---|---|---|---|
| 5,768,884 | A * | 6/1998 | Hines | F02C 7/143 60/728 |
| 2006/0225431 | A1 * | 10/2006 | Kupratis | F01D 15/10 60/791 |
| 2012/0221157 | A1 * | 8/2012 | Finney | G06F 1/26 700/287 |
| 2014/0250860 | A1 * | 9/2014 | Sidelkovskiy | F02C 3/107 60/39.15 |

* cited by examiner

*Primary Examiner* — Pascal M Bui Pho
*Assistant Examiner* — Katheryn Malatek
(74) *Attorney, Agent, or Firm* — John Ryznic

(57) ABSTRACT

An apparatus and a process for converting a twin spool aero gas turbine engine to an industrial gas turbine engine, where the fan of the aero engine is removed and replaced with an electric generator, a power turbine is added that drives a low pressure compressor that is removed from the aero engine, variable guide vanes are positioned between the high pressure turbine and the power turbine, and a low pressure compressed air line is connected between the outlet of the low pressure compressor and an inlet to the high pressure compressor, where a hot gas flow produced in the combustor first flows through the high pressure turbine, then through the low pressure turbine, and then through the power turbine.

12 Claims, 1 Drawing Sheet

APPARATUS AND PROCESS FOR CONVERTING AN AERO GAS TURBINE ENGINE INTO AN INDUSTRIAL GAS TURBINE ENGINE FOR ELECTRIC POWER PRODUCTION

CROSS-REFERENCE TO RELATED APPLICATIONS

This application claims the benefit to U.S. Provisional Application 62/101,993 filed on Jan. 10, 2015 and entitled APPARATUS AND PROCESS FOR CONVERTING AN AERO GAS TURBINE ENGINE INTO AN INDUSTRIAL GAS TURBINE ENGINE FOR ELECTRIC POWER PRODUCTION.

GOVERNMENT LICENSE RIGHTS

None.

BACKGROUND OF THE INVENTION

Field of the Invention

The present invention relates generally to a gas turbine engine, and more specifically to an apparatus and a process for converting an aero gas turbine engine with a fan into an industrial gas turbine engine for electrical power production.

Description of the Related Art Including Information Disclosed Under 37 CFR 1.97 and 1.98

FIG. 1 shows an aero gas turbine engine with a fan that is used in an aircraft. One such engine is the CFM56 series of aero gas turbine engines. The CFM International CFM56 series is a family of high-bypass turbofan aircraft engines made by CFM International (CFMI), with a thrust range of 18,000 to 34,000 pounds-force (80 to 150 kilonewtons). The CFM56 first ran in 1974 and, despite initial export restrictions, is now one of the most common turbofan aircraft engines in the world, with more than 20,000 having been built in four major variants. It is most widely used on the Boeing 737 airliner and, under military designation F108, replaced the Pratt & Whitney JT3D engines on many KC-135 Stratotankers in the 1980s, creating the KC-135R variant of this aircraft. It is also the only engine (CFM56-5C) used to power the Airbus A340-200 and 300 series. The engine (CFM56-5A and 5B) is also fitted to Airbus A320 series aircraft.

In the aero engine of FIG. 1, a high pressure spool rotates around a low pressure spool. The high pressure spool includes a high pressure compressor (HPC) 11 connected to a high pressure turbine (HPT) 13 through an outer shaft, and a combustor 12 that takes in compressed air from the HPC and produces a hot gas flow from burning a fuel that is passed through the HPT 13. A low pressure turbine (LPT) 15 is located immediately downstream from the HPT 13 and is connected to drive a low pressure compressor (LPC) 14 and a fan 16 through an inner shaft. The LPC 14 compresses air that is passed into the HPC 11.

In a gas turbine engine, such as a large frame heavy-duty industrial gas turbine (IGT) engine, a hot gas stream generated in a combustor is passed through a turbine to produce mechanical work. The turbine includes one or more rows or stages of stator vanes and rotor blades that react with the hot gas stream in a progressively decreasing temperature. The efficiency of the turbine—and therefore the engine—can be increased by passing a higher temperature gas stream into the turbine. However, the turbine inlet temperature is limited to the material properties of the turbine, especially the first stage vanes and blades, and an amount of cooling capability for these first stage airfoils.

In an industrial gas turbine engine used for electrical power production, during periods of low electrical demand the engine is reduced in power. During periods of low electrical power demand, prior art power plants have a low power mode of 40% to 50% of peak load. At these low power modes, the engine efficiency is very low and thus the cost of electricity is higher than when the engine operates at full speed with the higher efficiency.

Industrial and marine gas turbine engines used today suffer from several major issues that include low component (compressor and turbine) performance for high cycle pressure ratios or low part load component efficiencies or high CO (carbon monoxide) emissions at part load when equipped with low NOx combustors which limit the low power limit at which they are allowed to operate (referred to as the turn-down ratio).

One prior art IGT engine uses a single shaft IGT engine with a compressor connected to a turbine with a direct drive electric generator on the compressor end. Another prior art IGT engine is a dual shaft IGT engine with a high spool shaft and a separate power turbine that directly drives an electric generator. Still another IGT engine is a dual shaft aero derivative gas turbine engine with concentric spools in which a high pressure spool rotates around the low pressure spool, and where a separate low pressure shaft that directly drives an electric generator. Another prior art IGT engine uses a three-shaft IGT engine with a low pressure spool rotating within a high pressure spool, and a separate power turbine that directly drives an electric generator.

The configuration of single shaft IGT engine with a compressor connected to a turbine with a direct drive electric generator is the most common for electric power generation and is limited by non-optimal shaft speeds for achieving high component efficiencies at high pressure ratios. The mass flow inlet and exit capacities are limited structurally by $AN^2$ (last stage blade stress) and tip speeds that limit inlet and exit diameters due to high tip speed induced Mach # losses in the flow. Therefore for a given rotor speed, there is a maximum inlet diameter and corresponding flow capacity for the compressor and exit diameter and flow capacity for the turbine before the compressor and turbine component efficiencies start to drop off due to high Mach # losses.

Since there is a fixed maximum inlet flow at high pressure ratios on a single shaft, the rotor blades start to get very small in the high pressure region of the compressor flow path. The small blade height at a relatively high radius gives high losses due to clearance and leakage affects. High pressure ratio aircraft engines overcome this limitation by introduction of separate high pressure and low pressure shafts. The high pressure shaft (outer spool or shaft) turns at a faster speed allowing for smaller radius while still accomplishing a reasonable work per stage. An example for this is dual shaft aero derivative gas turbine engine with concentric spools, which is typical of an aero-derivative gas turbine engine used for electrical power production. The speed of the high pressure spool is still limited by having a low speed shaft inside the inner diameter (ID) of the high pressure shaft. This drives the high pressure shaft flow path to a higher radius relative to what might otherwise be feasible, which thereby reduces the speed of the high pressure rotor, creating smaller radius blades which reduce the efficiency of the high pressure spool. The dual shaft IGT engine with a high spool shaft and a separate power turbine that directly drives an electric generator arrangement is similarly limited in achieving high component efficiencies at high pressure ratios as the single shaft IGT engine with a compressor connected to a turbine with a direct drive electric generator on the compressor end since the entire compressor is on one shaft.

Turn down ratio is the ratio of the lowest power load at which a gas turbine engine can operate (and still achieve CO emissions below the pollution limit) divided by the full 100% load power. Today's gas turbines have a turn down ratio of around 40%. Some may be able to achieve 30%. Low part load operation requires a combination of low combustor exit temperatures and low inlet mass flows. Low CO emissions require a high enough combustor temperature to complete the combustion process. Since combustion temperature must be maintained to control CO emissions, the best way to reduce power is to reduce the inlet mass flow. Typical single shaft gas turbine engines use multiple stages of compressor with variable guide vanes to reduced inlet mass flow. The limit for the compressor flow reduction is around 50% for single shaft constant rotor speed compressors. The dual shaft aero derivative gas turbine engine arrangement is similarly limited as the single shaft IGT engine arrangement in flow inlet mass flow reduction since the low pressure compressor runs the constant speed of the generator.

Another prior art IGT engine is a three-shaft IGT engine with a low pressure spool rotating within a high pressure spool, and a separate power turbine 4 that directly drives an electric generator, which is the most efficient option of the current configurations for IGT engines, but is not optimal because the low spool shaft rotates within the high spool shaft, and thus a further reduction in the high spool radius cannot be achieved. In addition, if the speed of the low spool shaft is reduced to reduce inlet mass flow, there is a mismatch of angle entering the LPT (Low Pressure Turbine) from the HPT (High Pressure Turbine) and mismatch of the flow angle exiting the LPT and entering the PT (Power Turbine) leading to inefficient turbine performance at part load.

BRIEF SUMMARY OF THE INVENTION

An apparatus and a process for converting a twin spool aero engine with a fan into an industrial gas turbine engine that drives an electric generator, where the fan is removed from the aero engine, the low pressure compressor is removed from the aero engine, an electric generator is connected to the low pressure turbine of the aero engine, a power turbine is located downstream from the low pressure turbine, and the low pressure compressor is connected to the power turbine so that a hot gas flow produced in the combustor will pass through the high pressure turbine, then the low pressure turbine to drive the electric generator, and then through the power turbine to drive the low pressure compressor, where the low pressure compressed air is channeled from the low pressure compressor and discharged into an inlet of the high pressure compressor. Inlet guide vanes are located between the low pressure turbine and the power turbine to regulate a speed of the low pressure compressor while maintaining the speed of the electric generator at a constant rotational speed.

In one embodiment, the low pressure compressor of the aero engine can be reused in the industrial engine which will be driven by the power turbine. Variable inlet guide vanes can be used at the inlet to the low pressure compressor in order to regulate flow and thus speed of the engine.

DETAILED DESCRIPTION OF THE INVENTION

Figure 1:
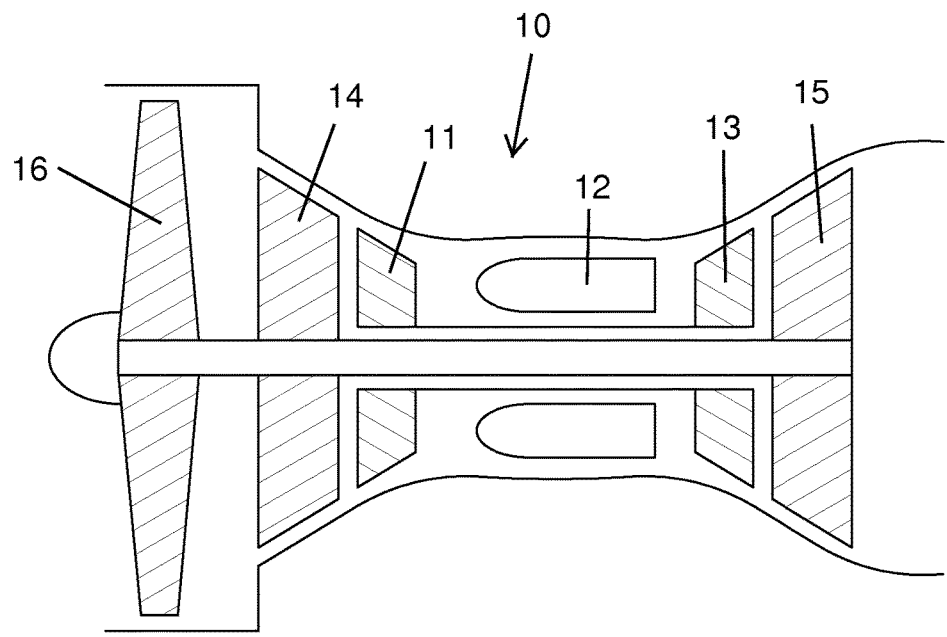
FIG. 1 shows a schematic representation of an aero gas turbine engine with a fan of the prior art.

The present invention is an apparatus and a process for converting an aero gas turbine engine with a fan such as the aero engine in FIG. 1 into an industrial gas turbine engine that is used to drive an electric generator and produce electrical power. The converted aero engine is shown in FIG. 2 and includes the high speed spool with the high pressure compressor 11 connected to the high pressure turbine 13 and the combustor 12 located between them.

Figure 2:
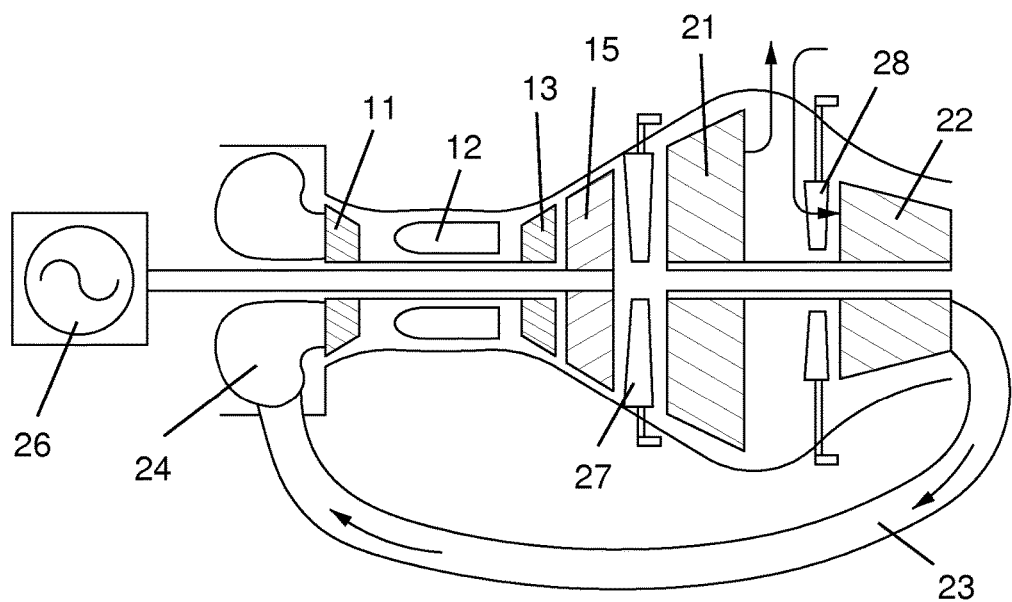
FIG. 2 shows a schematic representation of the aero engine from FIG. 1 converted into an industrial gas turbine engine for electrical power production according to the present invention.

In the FIG. 2 converted engine, the low pressure compressor (LPC) 14 and the fan 16 of the FIG. 1 engine is removed and replaced with an electric generator 26 that is driven directly by the inner spool or shaft connected to the low pressure turbine (LPT) 15. In the FIG. 2 invention, the LPT 15 now becomes an intermediate or middle pressure turbine (MPT) 15, and a low pressure turbine (LPT) 21 is added in a downstream flow path from the MPT 15. The low pressure compressor 14 of the aero engine can be reused as the low pressure compressor 22 of the industrial engine that is driven by the power turbine 21. The LPT 21 is connected by a spool or shaft to a low pressure compressor (LPC) 22 that supplies compressed air to an inlet volute 24 of the HPC 11 through a compressed air line 23. Turbine exhaust from the LPT 21 flows out from the engine as seen by the arrow, while ambient air is drawn into the LPC 22 through a duct as seen by the arrow in FIG. 2. The HPC 11 can also include multiple variable stator vanes (VSV). Variable inlet guide vanes 28 can be used in the industrial engine at the inlet to the low pressure compressor 22 in order to regulate the flow and thus control the speed of the engine. Variable inlet guide vanes 27 are also used at an inlet to the power turbine 21.

The IGT engine of FIG. 2 uses the LPT 15 to directly drive the electric generator 26 and thus will operate at a constant rotational speed such as 3,600 rpm for a US generator (60 Hz) or 3,000 rpm for a European generator (50 Hz). The high spool with the HPC 11 and the HPT 13 can operate at variable speeds with respect to the high spool because the two spools or shafts are not connected mechanically. The LPT 21 and the LPC 22 can thus be operated as a separate unit from the high spool by using the variable inlet guide vanes 27 so that compressed air delivered to the HPC 11 can be controlled based on the engine load (full power or partial power).

Variable inlet guide vanes can be used in the industrial engine of the present invention in three different embodiment. Variable inlet guide vanes 27 and 28 can be used at the inlet to the power turbine 21, or at the inlet to the low pressure compressor 22, or at the inlets of both the power turbine 21 and the low pressure compressor 22.

We claim the following:

1. Process of converting a twin spool aero gas turbine engine having an outer spool and an inner spool with a fan into an industrial gas turbine engine that drives an electric generator comprising the steps of:

removing the fan from the twin spool aero gas turbine engine;

removing a first low pressure compressor from the inner spool of the twin spool aero gas turbine engine;

connecting the inner spool to the electric generator;

placing a power turbine downstream from a low pressure turbine such that an exhaust from the low pressure turbine drives the power turbine;

connecting a second low pressure compressor to the power turbine at an aft end of the industrial gas turbine engine such that the power turbine drives the second low pressure compressor to produce low pressure compressed air; and, passing the low pressure compressed air from the second low pressure compressor into a high pressure compressor of the outer spool;

wherein compressed air from the high pressure compressor passes into a combustor to produce a hot gas stream that flows through the high pressure turbine to the low pressure turbine to drive the electric generator, the exhaust from the low pressure turbine flows through the power turbine that drives the second low pressure compressor, and the low pressure compressed air from the second low pressure compressor flows into the high pressure compressor.

2. The process of converting the twin spool aero gas turbine engine into the industrial gas turbine engine of claim 1, and further comprising the step of:

placing a row of turbine variable guide vanes at an inlet to the power turbine.

3. The process of converting the twin spool aero gas turbine engine into the industrial gas turbine engine of claim 1, and further comprising the step of:

reusing the first low pressure compressor of the twin spool aero engine as the second low pressure compressor that is driven by the power turbine in the industrial engine.

4. The process of converting the twin spool aero gas turbine engine into the industrial gas turbine engine of claim 1, and further comprising the step of:

placing a row of compressor variable inlet guide vanes at an inlet to the second low pressure compressor.

5. An industrial gas turbine engine converted from a twin spool aero gas turbine engine with a fan comprising:

a low spool shaft with a first low pressure turbine directly connected at one end and an electric generator connected at an opposite end, wherein the opposite end is a forward end of the industrial gas turbine engine and a low pressure compressor is removed from the low spool shaft;

a high spool shaft rotatable over the low spool shaft with a high pressure compressor connected to a high pressure turbine;

a combustor connected between the high pressure compressor and the high pressure turbine;

a second low pressure turbine located downstream from the first low pressure turbine such that hot gas exhaust from the first low pressure turbine drives the second low pressure turbine;

wherein the low pressure compressor is located at an aft end of the industrial gas turbine engine and air flows from the low pressure compressor to the high pressure compressor at the forward end of the industrial gas turbine engine through a compressed air line connecting an outlet of the low pressure compressor to an inlet of the high pressure compressor to the combustor to the high pressure turbine to the first low pressure turbine to the second low pressure turbine, the low pressure compressor driven by the second low pressure turbine; and, a row of turbine variable guide vanes located between the first low pressure turbine and the second low pressure turbine.

6. The industrial gas turbine engine converted from the twin spool aero gas turbine engine with the fan of claim 5, and further comprising: all of the compressors and all of the turbines are axial flow devices.

7. The industrial gas turbine engine converted from the twin spool aero gas turbine engine with the fan of claim 5, and further comprising:

a hot gas flow produced in the combustor passes through the high pressure turbine first, then the first first low pressure turbine, and then through the second low pressure turbine.

8. The industrial gas turbine engine converted from the twin spool aero gas turbine engine with the fan of claim 5, and further comprising:

the low pressure compressor of the industrial engine is the low pressure compressor of the twin spool aero engine; and, a row of compressor variable inlet guide vanes at an inlet to the low pressure compressor.

9. An industrial gas turbine engine converted from a twin spool turbofan aero gas turbine engine comprising:

a low spool shaft with a first low pressure turbine directly connected at one end and an electric generator connected at an opposite end, wherein the opposite end is a forward end of the industrial gas turbine engine and a first low pressure compressor is removed from the low spool shaft;

a high spool shaft rotatable over the low spool shaft with a high pressure compressor connected to a high pressure turbine;

a combustor connected between the high pressure compressor and the high pressure turbine;

a second low pressure turbine located downstream from the first low pressure turbine such that hot gas exhaust from the first low pressure turbine drives the second low pressure turbine with the low pressure compressor driven by the second low pressure turbine;

a second low pressure compressor driven by the second low pressure turbine; and, a row of turbine variable guide vanes located between the first low pressure turbine and the second low pressure turbine;

wherein the second low pressure turbine is located at an aft end of the industrial gas turbine engine and air flows from the second low pressure compressor to the high pressure compressor at the forward end of the industrial gas turbine engine through a compressed air line connecting an outlet of the second low pressure compressor to an inlet of the high pressure compressor to the combustor to the high pressure turbine to the first low pressure turbine to the second low pressure turbine.

10. The industrial gas turbine engine converted from the twin spool turbofan aero gas turbine engine of claim 9, and further comprising:

all of the compressors and all of the turbines are axial flow devices.

11. The industrial gas turbine engine converted from the twin spool turbofan aero gas turbine engine of claim 9, and further comprising:

a hot gas flow produced in the combustor passes through the high pressure turbine first, then through the first low pressure turbine, and then through the second low pressure turbine.

12. The industrial gas turbine engine converted from the twin spool turbofan aero gas turbine engine of claim 9, and further comprising:
   the second low pressure compressor of the industrial engine is the first low pressure compressor of the twin spool aero engine; and,
   a row of compressor variable inlet guide vanes at an inlet to the second low pressure compressor.

* * * * *